United States Patent
Andersen

(10) Patent No.: US 8,512,089 B2
(45) Date of Patent: Aug. 20, 2013

(54) FLOATABLE UNIT FOR EVACUATION PURPOSES

(75) Inventor: Ole Andersen, Tjaereborg (DK)

(73) Assignee: Viking Life-Saving Equipment A/S, Esbjerg V (DK)

( * ) Notice: Subject to any disclaimer, the term of this patent is extended or adjusted under 35 U.S.C. 154(b) by 280 days.

(21) Appl. No.: 12/596,044

(22) PCT Filed: Apr. 16, 2008

(86) PCT No.: PCT/DK2008/000136
§ 371 (c)(1),
(2), (4) Date: Mar. 4, 2010

(87) PCT Pub. No.: WO2008/131763
PCT Pub. Date: Nov. 6, 2008

(65) Prior Publication Data
US 2010/0173544 A1   Jul. 8, 2010

(30) Foreign Application Priority Data

Apr. 26, 2007  (DK) .................................. 2007 00618
May 7, 2007   (DK) .................................. 2007 00683

(51) Int. Cl.
*B63B 35/58*   (2006.01)
(52) U.S. Cl.
USPC ............................................. 441/42; 441/40
(58) Field of Classification Search
USPC ................................ 114/345, 352–354; 441/42
See application file for complete search history.

(56) References Cited

U.S. PATENT DOCUMENTS

| | | | | |
|---|---|---|---|---|
| 4,351,500 A | * | 9/1982 | Golze | 244/105 |
| 4,597,355 A | * | 7/1986 | Kirby | 114/345 |
| 6,145,465 A | * | 11/2000 | Murphree | 114/353 |
| 6,367,404 B1 | * | 4/2002 | Callahan | 114/353 |
| 2002/0056409 A1 | | 5/2002 | Murphree et al. | |
| 2007/0295255 A1 | * | 12/2007 | Stryjewski et al. | 114/61.22 |

FOREIGN PATENT DOCUMENTS

| | | |
|---|---|---|
| DE | 357124 | 8/1922 |
| DE | 7 009 587 | 8/1973 |
| EP | 0 181 682 A1 | 5/1986 |
| EP | 0 639 496 A2 | 2/1995 |
| GB | 2 135 940 A | 9/1984 |
| WO | WO 2006/048504 A1 | 5/2006 |

OTHER PUBLICATIONS

Written Opinion corresponding to International Application No. PCT/DK2008/00136, European Patent Office, dated Sep. 10, 2008, 7 pages.
International Search Report corresponding to International Application No. PCT/DK2008/000136, European Patent Office, dated Sep. 10, 2009, 8 pages.

* cited by examiner

*Primary Examiner* — Edwin Swinehart
(74) *Attorney, Agent, or Firm* — Wood, Herron & Evans, LLP

(57) ABSTRACT

The present invention relates to a floatable unit for evacuation purposes, which in a storage situation comprises at least two shells made of rigid or semi-rigid material, said shells being adapted to accommodate a deflated structure. Said deflated structure of the unit, during an evacuation situation, is inflated and the shells are attached to the inflated structure whereby the shells operate as hull parts for the floatable unit.

20 Claims, 11 Drawing Sheets

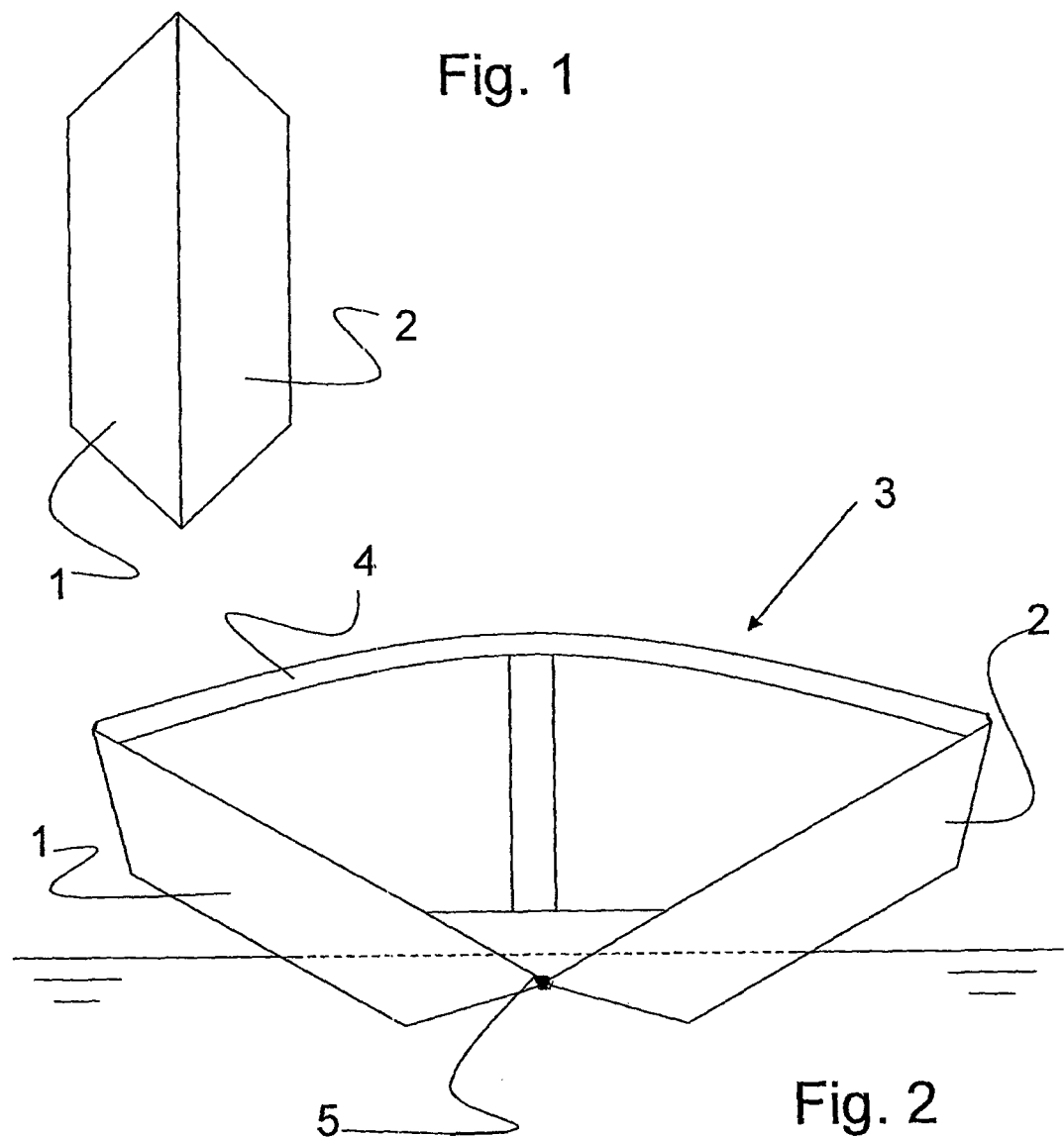

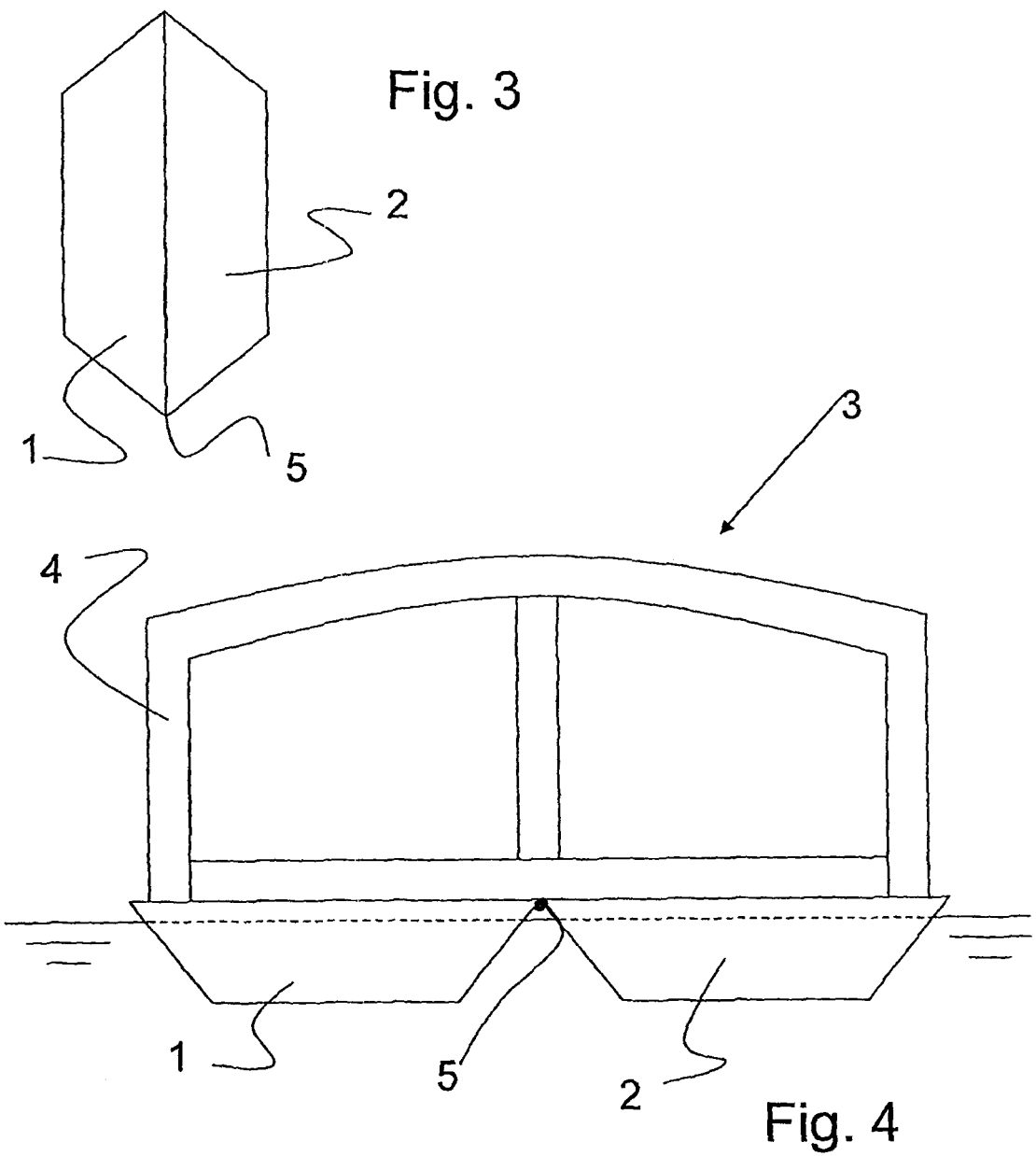

FLOATABLE UNIT FOR EVACUATION PURPOSES

CROSS-REFERENCE TO RELATED APPLICATIONS

This application is a U.S. national phase of International Application No. PCT/DK2008/000136, filed Apr. 16, 2008, which claims the benefit of priority to Denmark Application Nos. PA 2007 00618, filed Apr. 26, 2007 and PA 2007 00683, filed May 7, 2007, which are incorporated by reference in their entirety.

TECHNICAL FIELD OF THE INVENTION

The present invention relates to a floatable unit for evacuation purposes, which in a storage situation comprises at least two shells made of rigid or semi-rigid material, said shells being adapted to accommodate a deflated structure.

BACKGROUND ART

Evacuation of ship passengers and crew members in event of an emergency into inflatable liferafts or lifeboats is well known.

The liferafts are normally stored onboard of the vessel in containers in a deflated state. In this storage situation, the containers do not take up much room or space on the deck. Furthermore, rack systems may be provided on the deck of the vessel for accommodate one or more containers. During the evacuation situation, the container is either thrown overboard into the water, wherein after it is inflated, or it is inflated onboard and subsequently lowered onto the water. Then, the evacuation of persons can take place.

The inflatable liferafts are today suitable for evacuation of up to 150 persons per liferaft. If large passenger or cruise ships, where a high number of passengers are present, are to be equipped with liferafts, a considerable number of liferafts have to be installed. The containers take up a lot of deck space, which clearly is a disadvantage for passenger or cruise ships, where the ship-owners will appreciate space on the decks for the passengers.

In WO 2006/048504, a lifeboat is disclosed, which lifeboat comprises a hull part and a cover part, wherein the cover part can be moved up and down in relation to the hull part. The lifeboat also occupies a considerable space on board of the vessel which many ship-owners will like to avoid. Furthermore, systems for launching the lifeboat from the vessel are necessary due to a considerable weight of the lifeboat. The lifeboat may accommodate about 150 persons.

Furthermore, lifeboats and liferafts which are deployed directly from the deck of the vessel require some kind of lifting arrangement. This could for instance be a known david. Support and a base for lifting arrangement are also necessary. The lifting arrangement and support/base also occupy at lot of the deck space.

Thus, there is a need for providing a flexible solution to the above-mentioned disadvantages.

SUMMARY OF THE INVENTION

An object of the present invention is to wholly or partly overcome the above disadvantages and drawbacks of the prior art. More specifically, it is an object to provide a floatable unit for evacuation purposes.

It is also an object of the present invention to provide a floatable unit which does not occupy a lot of deck space, since the ship-owners prefer usable deck space.

The above objects, together with numerous other objects, advantages and features, which will become evident from the below description, are accomplished by a solution in accordance with the present invention by said deflated structure of the unit during an evacuation situation being inflated and the shells being attached to the inflated structure whereby the shells operate as hull parts for the floatable unit.

Hereby a floatable unit is obtained, which in a storage position on the vessel does not occupy much deck space compared to a lifeboat, due to the deflated state of the inflatable structure. Also, by using the, at least, two shells as hull parts, it is obtained that the floatable unit has a higher strength than normal inflatable liferafts, whereby the capacity of the floatable unit may be increased. Additionally, the shells which accommodate the deflated structure in the storage situation protect the deflated structure and ensure that it is not decomposed by the maritime environment, i.e. salty water, humidity, UV, etc. Moreover, by using the inflated structure, the injuries obtained by the persons being evacuated, for instance when the floatable unit moves unexpectedly, e.g. in the situation where the floatable unit is slammed against the vessel side, are minimized, since the inflated structure has an overall softness and cushioning effect.

Furthermore, the inflated structure may at least partly be arranged between the shells in the evacuation situation.

According to the invention, the shells may be attached to the inflated structure symmetrical on both sides of a centre line of the floatable unit, so that even strength both in the longitudinal and transverse direction of the floatable unit is obtained.

According to the invention, the shells may, during the evacuation situation, be directly or indirectly connected.

According to the invention, the shells may be directly connected by hinge means or the like.

According to the invention, the shells may via their direct connection form a V- or W-shape and the inflated structure may be placed between the shells.

According to the invention, the shells may be indirectly connected via the inflated structure.

According to the invention, the shells may, during the evacuation situation, be used as side parts for the floatable unit, so that the shells may protect the inflatable structure, especially against the potential risk for rupture or puncture of the inflatable structure during the evacuation situation, where the floatable unit is moored to the vessel side.

According to the invention, parts of the shells may be adapted to extend downwards into the water whereby a keel effect is provided, so that the floatable unit floats steadier in the water, whereby for the evacuated persons a more comfortable floatable unit movement-wise is obtained. Also, a higher directional stability of the floating unit is obtained.

According to the invention, the shells and/or the inflated structure may comprise ballast means. Within the inventive idea, it is an advantage that the ballast is situated inside the shells, whereby a lower overall resistance is provided for the floatable unit in relation to the known liferafts. Hereby, the floatable unit according to the invention is easier to tow and drive through the water.

According to the invention, the ballast means may comprise means for enabling rapid filling of the ballast means with a ballast substance, e.g. water, and for rapid emptying of the ballast substance. The ballast is not present in the storage situation, wherefore it is vital for the stability of the floatable unit in the evacuation situation that ballast may be obtained rapidly. Furthermore, if the floatable unit should capsize during the evacuation, it is also vital that the ballast may be emptied rapidly, so that it is possible to turn the floatable unit to its right position. Moreover, it is of great importance that the ballast may be emptied rapidly when the floatable unit is in an un-inflated or partly inflated situation.

According to the invention, propulsion means may be arranged, so that the floatable unit may transport itself away from the vessel at least to a safe area. Furthermore, control means may be arranged for controlling the propulsion means. Also, power supply means may be arranged for the propulsion means. The power supply means may be any suitable source, such as solar energy, electricity, combustion, or the like.

According to the invention, the shells in the storage situation may have a form as a ship or vessel. Tests have shown that persons who are to be evacuated have a tendency to feel more secure if they see a ship-shaped evacuation means, since, it is inherent for them that a ship-shape is known as a safe lifeboat.

According to the invention, the inflated structure may comprise seating arrangements, means for storing and/or means for providing berths. Hereby, is obtained that the evacuated persons may be placed in seating position, whereby the floating unit may have a higher capacity than the known liferafts, wherein the evacuated persons lie or sit on the bottom of the liferaft. Also, seating arrangements may be arranged above each other in a vertical direction.

According to the invention, the unit may be arranged for evacuating from 8 to 500 persons.

According to the invention, the inflatable structure may be made of a polymeric material, such as natural rubber (NR), polyurethane (PU), thermoplastic poly urethane (TPU), butyl rubber (BR), polyvinylchloride (PVC), polychloroprene (CR), polyethylene (PE), or a combination thereof.

According to the invention, the shells may be made of glass fibre reinforced plastic, composite material, metals, or a combination thereof.

According to the invention, the shells may be arranged extensible in a longitudinal direction of the floatable unit. Furthermore, each shell may comprise two or more shell parts which may be arranged telescopic movable in relation to each other so that the shells via the telescopic movement of the shell parts are extended in a longitudinal direction during the inflating of the floatable unit.

According to the invention, the shells may have longitudinal and/or transverse reinforcement elements, such as girders, stringers, frames and/or bulkheads. Hereby is obtained, that the overall strength both in the longitudinal and the transverse direction of the floatable unit is increased.

According to the invention, a canopy or the like may be arranged above the inflatable structure for protecting the evacuated persons.

According to the invention, the inflated structure at each end may have a stem/stem ship-shaped form.

According to the invention, an anti-rolling device may be attached to at least one of the shells.

According to the invention, the deflated structure in the storage situation may be fully accommodated in the shells.

According to the invention each shell may comprise two or more shell parts, said shell parts during an inflating procedure being movable in a substantially longitudinal direction in relation to each other, and being connected by at least one element.

According to the invention the element(s) may be rigid, partly flexible, flexible, resilient or a combination thereof.

According to the invention, the element(s) may be a fabric or a textile. Also, the element(s) may be rod(s) or bar(s).

Furthermore, the floatable unit may have a longitudinal direction and a transverse direction, four corners being created between the longitudinal direction and the transverse direction, the floatable unit comprises at least one shell at each corner of the unit, said shells extending from each corner in the longitudinal direction of the unit and said shells being mutually connected via the inflated structure.

Additionally, the shells may be directly or indirectly connected in the longitudinal direction of the floatable unit.

Also, ballast means may be arranged in the longitudinal direction between the shells. Moreover, the inflated structure at least in one corner may be arranged so that propulsion means can be arranged in a prolongation of the longitudinal direction of the inflated structure.

According to the invention, the shells and the inflated structure may be detachable or securely connected. Furthermore, the shells and the inflated structure may comprise corresponding connection means. The connection means may be zips, groove/flange connection, frapping, he/she connections or the like.

Also, according to the invention, the inflated structure may comprise at least one inflatable flotation tube, said inflatable tube extending circumferentially for providing a substantially ring-shaped area, and a bottom element which is adapted to provide a bottom to the substantially ring-shaped area, in said ring-shaped area a plurality of separate inflatable seating arrangements are arranged.

The term "ring-shaped area" is in this context to be construed as the tube defining the outer periphery of the inflated structure. The ring-shaped area is the area wherein the evacuated people are located while they are present in the floatable unit. The configuration of the ring-shaped area may be round, elliptic, rectangular, pentagonal, hexagonal, octagonal, or others.

Furthermore, the seating arrangements may be arranged parallel to each other across the ring-shaped area, with a predetermined distance between them.

BRIEF DESCRIPTION OF THE DRAWINGS

The invention and its many advantages will be described in more detail below with reference to the accompanying schematic drawings, which for the purpose of illustration show some non-limiting embodiments and in which FIG. 1 shows schematically in a front view an embodiment of the floatable unit according to the invention in a storage situation, FIG. 2 shows schematically in a front view the embodiment of FIG. 1 in an evacuation situation, FIG. 3 shows schematically in a front view another embodiment of the floatable unit according to the invention in a storage situation, FIG. 4 shows schematically in a front view the embodiment of FIG. 3 in an evacuation situation.

Figure 5:
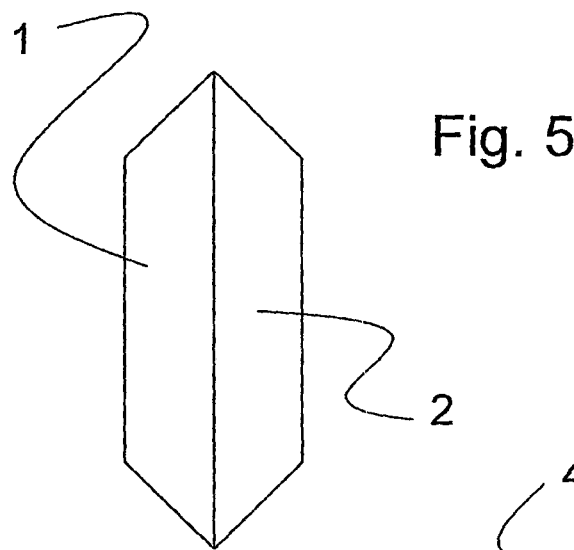
FIG. 5 shows schematically in a front view a further embodiment of the floatable unit according to the invention in a storage situation.

All the figures are highly schematic and not necessarily to scale, and they show only parts which are necessary in order to elucidate the invention, other parts being omitted or merely suggested.

DESCRIPTION OF PREFERRED EMBODIMENTS

In FIG. 1, an embodiment of the floatable unit in a storage situation is shown schematically in a front view. In the embodiment, two shells 1, 2 accommodate a deflated structure. Said shells being made of rigid or semi-rigid material, which for this embodiment as well as the below-mentioned may be glass fibre reinforced plastic, composite material, metals, or a combination thereof.

The two shells 1, 2 and the deflated structure accommodated inside may be placed on a deck of a ship known per se or may be placed in a rack system also known per se. Neither the deck nor the rack system has been shown.

In FIG. 2, an embodiment of the floatable unit 3 according to the invention is shown schematically in a front view during an evacuation situation. According to the inventive idea, the deflated structure of the unit is inflated and the shells 1, 2 are attached to the inflated structure 4 whereby the shells 1, 2 operate as hull parts for the floatable unit 3. The inflated structure may be made of a polymeric material, such as natural rubber (NR), polyurethane (PU), thermoplastic poly urethane (TPU), butyl rubber (BR), polyvinylchloride (PVC), polychloroprene (CR), polyethylene (PE), or a combination thereof.

The floatable unit 3 is shown floating in the water. The shells 1, 2 of the floatable unit 3 are in this embodiment directly connected by hinge means 5 or the like. Furthermore, the shells 1, 2 via their direct connection form in this embodiment an overall V-shape and the inflated structure 4 is placed between the shells 1, 2. In other embodiments, the overall shape of the directly connected shells 1, 2 may for instance be a W-shape. In this and subsequent embodiments, the inflated structure 4 forms a 3-dimensional space frame interconnecting the shells and maintaining the shells in spaced relation.

In FIG. 3, another embodiment of the floatable unit in a storage situation is shown schematically in a front view. In FIG. 4, another embodiment of the floatable unit 3 according to the invention is shown schematically in a front view during an evacuation situation. The shells 1, 2 of the floatable unit 3 are in this embodiment connected via the connection point 5 and the shells 1, 2 thereby form a catamaran-hull upon which the inflated structure 4 extends.

Common for the above-mentioned embodiments are that after the shells 1, 2 with the deflated structure are launched into the water, the deflated structure is starting to be inflated. At the same time, the shells 1, 2 open around a turning or connection point 5 so that the inflated structure 4 may expand to the desired shape while the shells 1, 2 still are directly connected in the connection point 5, e.g. a hinge.

Figure 6:
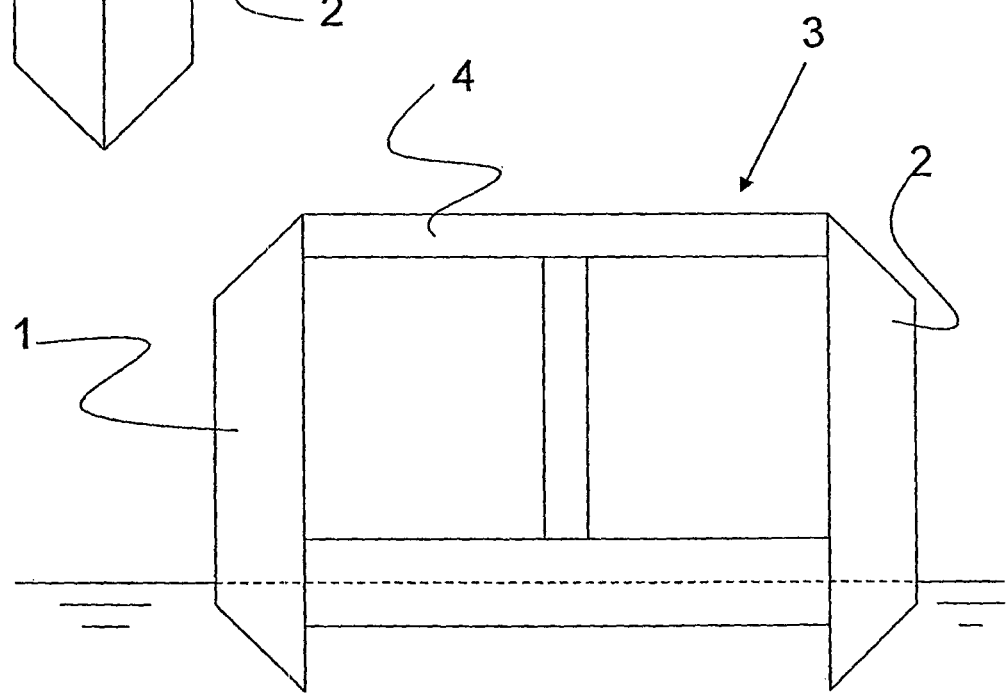
FIG. 6 shows schematically in a front view the embodiment of FIG. 5 in an evacuation situation.

In FIG. 5, a further embodiment of the floatable unit in a storage situation is shown schematically in a front view. In FIG. 6, another embodiment of the floatable unit 3 according to the invention is shown schematically in a front view during an evacuation situation. The shells 1, 2 are in this embodiment indirectly connected via the inflated structure 4. Furthermore, the shells 1, 2 are in this embodiment used as side parts for the floatable unit 3, whereby the inflated structure 4 of the floatable unit 3 is protected for rupture and damage.

Figure 7A:
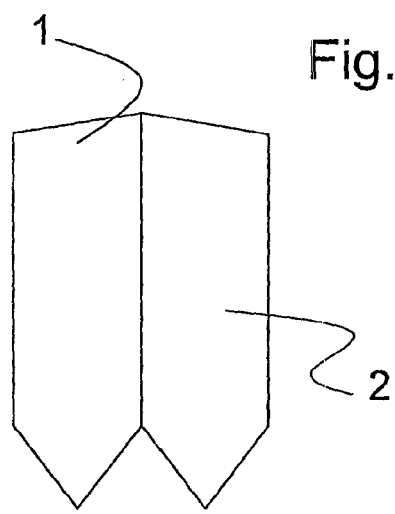
FIG. 7a shows schematically in a front view an additional embodiment of the floatable unit according to the invention in a storage situation.
Figure 7B:
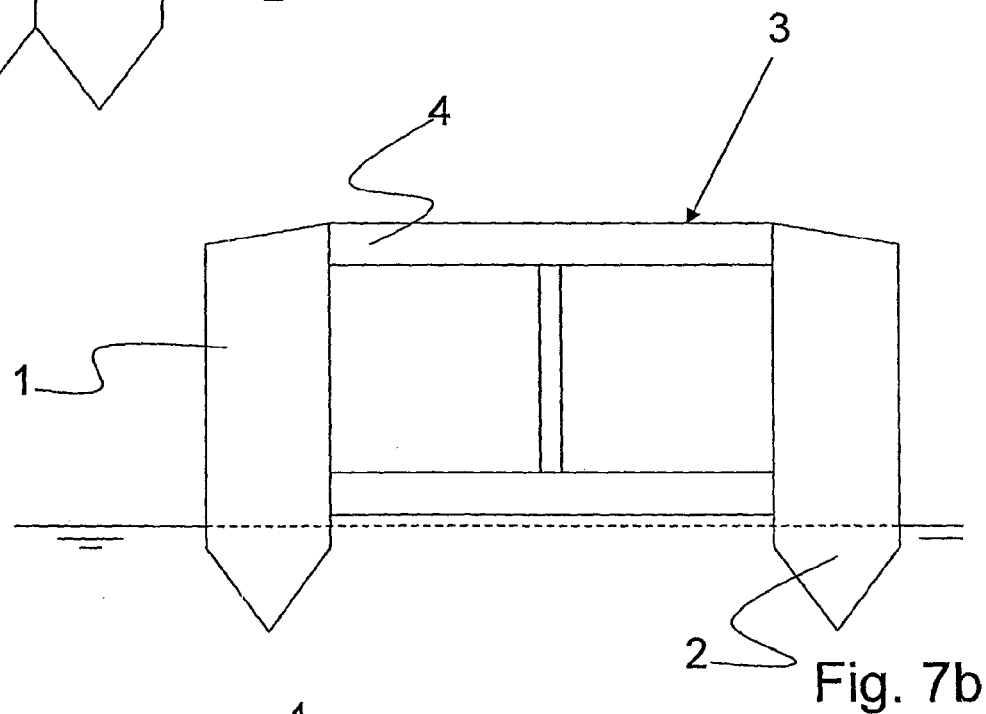
FIG. 7b shows schematically in a front view the embodiment of FIG. 7a in an evacuation situation.

In FIG. 7a, an additional embodiment of the floatable unit in a storage situation is shown schematically in a front view. In FIG. 7b, the additional embodiment of the floatable unit 3 according to the invention is shown schematically in a front view during an evacuation situation. The shells 1, 2 are in this embodiment also indirectly connected via the inflated structure 4. The floatable unit 3 shown in FIG. 7b has a catamaran-shaped hull. By using a catamaran-shaped hull, it is obtained that the risk for puncturing as well as rupturing the inflated structure caused by shipwrecks or similar items floating in the water, is minimized.

Figure 8A:
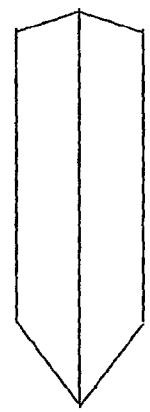
FIG. 8a shows schematically in a front view an additional embodiment of the floatable unit according to the invention in a storage situation.
Figure 8B:
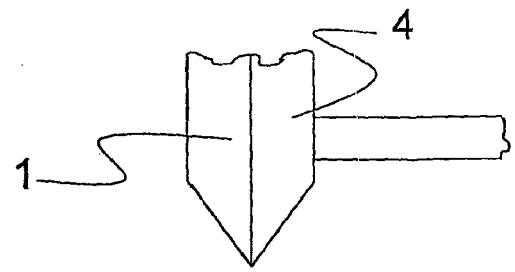
FIG. 8b shows schematically in a front view a part of a shell and the inflated structure of the embodiment of FIG. 8a, FIG. 9 shows schematically in a side view shell parts of one of the shells according to the invention.

In FIG. 8a, an embodiment of the floatable unit in a storage situation is shown schematically in a front view. FIG. 8b shows a part of one of the shells 1 and the inflated structure 4. In this embodiment, the hull part will comprise both the shell 1 as well as part of the inflated structure 4 as depicted in FIG. 8b. In this embodiment, the shells 1, 2 shown in FIG. 8a may be of a smaller width.

The shells 1, 2 according to the invention may have many different shapes and configurations and may be chosen in view of the specific desired properties of the shells, i.e. strength, volume, displacement, hydro-static, etc.

Furthermore, the above-mentioned embodiments all disclose two shells attached to the inflated structure, however, within the inventive idea, additional shells may be arranged, so that for instance an overall shape and function of the hull of the floatable unit is of a trimaran type. Also, additional shells may be used as roofing for the inflatable structure and may be support members for e.g. solar power cells.

Common for the above-mentioned embodiments of the invention, the shells 1, 2 are attached to the inflated structure 4 symmetrically on both sides of a centre line of the floatable unit 3, so that even strength both in the longitudinal and transverse direction of the floatable unit 3 is obtained.

Furthermore, according to the invention, parts of the shells 1, 2 are adapted to extend downwards into the water whereby a keel effect is provided. Also, the shells 1, 2 and/or the inflated structure 4 may comprise ballast means (not shown). The ballast means comprises means for enabling rapid filling of the ballast means with a ballast substance, e.g. water, and for rapid emptying of the ballast substance.

Figure 9:
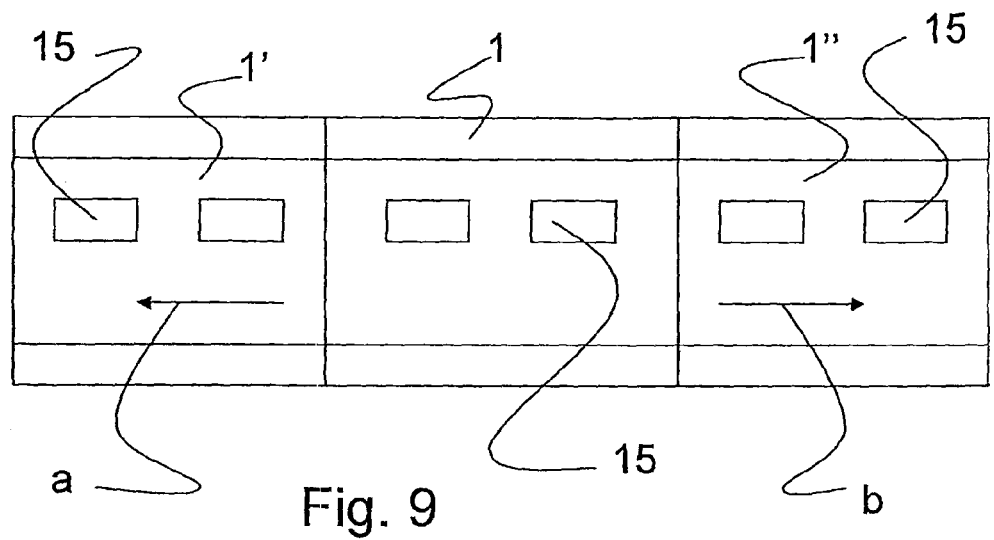

Within the inventive idea, the shells 1, 2 may be arranged extensible in a longitudinal direction of the floatable unit. In an embodiment according to the invention, which is shown schematically in FIG. 9, each shell 1 comprises two or more shell parts 1', 1" which are arranged telescopic movable in relation to each other (indicated by arrows a and b) so that the shells via the telescopic movement of the shell parts are extended in a longitudinal direction during the inflating of the floatable unit. Hereby is obtained that the shells, accommodating the deflated structure, occupy as little as possible of space onboard on the vessel, while still having the possibility of expanding and thereby supporting a large inflatable structure, said inflatable structure being considerably longer than the shells in the storage situation.

The shell parts 1', 1" may be telescopic moveable in relation to the shell 1 by means of for instance sliding rails or the like. Within the inventive idea, the shells 1, 2 may comprise a plurality of shell parts (not shown) which may be folded as a harmonium bellow so that the shells occupy only a little space in the storage situation, and still it may be unfolded and thereby extended during the floatable unit is being inflated.

Furthermore, the shells 1, 2 may be equipped with windows 15, which may be opened. The windows 15 may in the evacuation situation be used to natural ventilation, for instance by opening the windows so that fresh air ventilation for heat as well as for breathing sufficient oxygen (avoiding $CO_2$) for the evacuated persons present in the floatable unit. Obviously, the windows may also be made of a transparent material whereby the evacuated persons may look through them.

Figure 10:
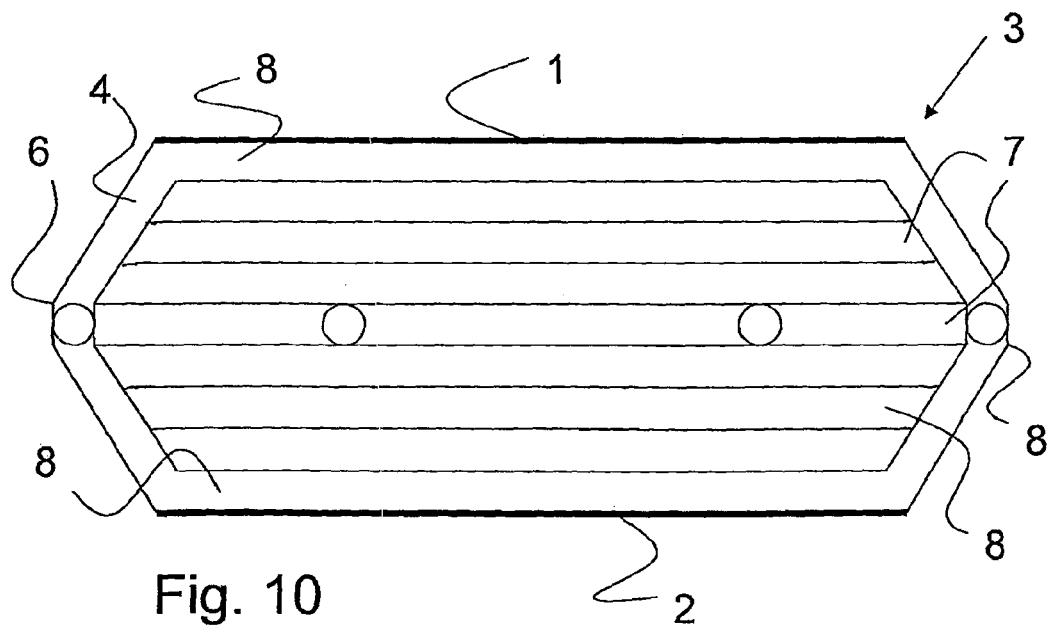
FIG. 10 shows schematically in a top view the interior of a floatable unit according to the invention.

In FIG. 10, the interior of a floatable unit 3 according to the invention is shown schematically in a top view. The shells 1, 2 are shown a side parts for the inflated structure 4, which extends between the shells. Furthermore, the inflated structure 4 at each ends 6, 7 has a stern/stem ship-form. Also, seating arrangements 8 are arranged in the longitudinal direction of the floatable unit 3, whereby it is possible for the evacuated persons to be in a seating position while being in the floatable unit 3. In one or both of the ends of the inflated structure, an entrance area may be arranged for making the entrance into the floatable unit, either by platform, slide, chute or the like, more comfortable for the persons being evacuated. The inflated structure may as well comprise means for storing and/or means for providing berths (not shown). Also the seating arrangements may be arranged above each other in a vertical direction (not shown). A preferred embodiment of a seating arrangement is described in connection with FIG. 20 below.

As easily seen from FIG. 10, the floatable unit may, according to the invention, be adapted to a high capacity, especially in view of the fact that the evacuated persons may use a seating position in stead of lying or sitting on the bottom of the known liferafts. Thus, the floatable unit may be arranged for evacuating from 8 to 500 persons.

Figure 11:
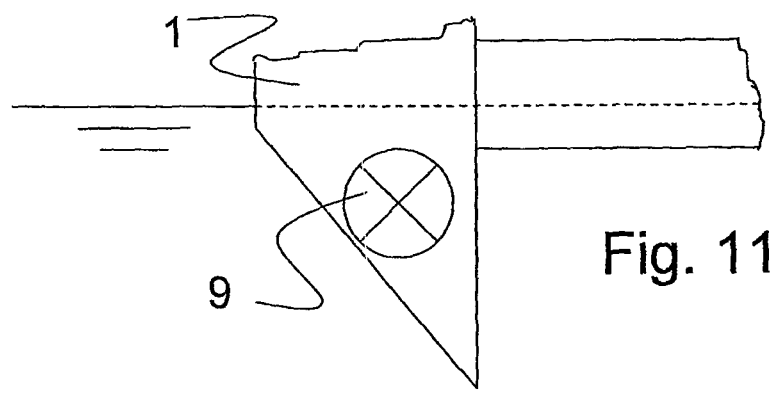
FIG. 11 shows schematically in detail one of the shells comprising propulsion means.
Figure 12:
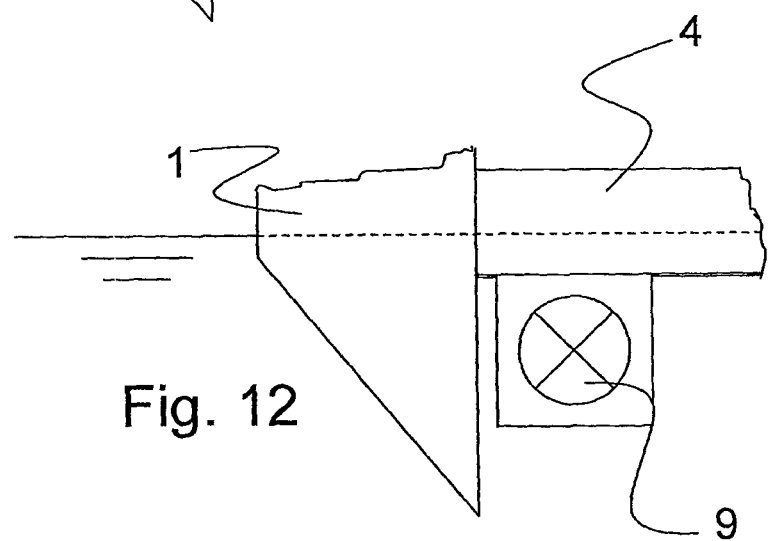
FIG. 12 shows schematically in detail that propulsion means are arranged in connection with the inflatable structure.

The floatable unit may furthermore comprise propulsion means. In FIG. 11, is shown that at least one of the shells 1 comprises propulsion means 9. Within the inventive idea, both shells may comprise propulsion means. In FIG. 12, is shown that the propulsion means 9 is arranged in connection with the inflated structure 4, in this embodiment below and next to the shell 1. In other embodiments, the propulsion means may be arranged at the inflated unit 4 at the centre line of the floatable unit. The propulsion means may be hingedly attached to either the shell(s) or the inflated structure.

The propulsion means 9 may e.g. be a propeller, air-jet, water-jet, propulsion fins, or the like. Furthermore, control means (not shown) may be arranged for controlling the propulsion means, both as steering means as well as power controlling device. Also, power supply means (not shown) may be arranged for the propulsion means. The power supply means may be any suitable source, such as for instance solar energy, electricity, combustion, diesel, petrol, or the like.

For increasing the strength of the floatable unit, the shells may have longitudinal and/or transverse reinforcement elements, such as girders, stringers, frames and/or bulkheads (not shown).

Figure 13:
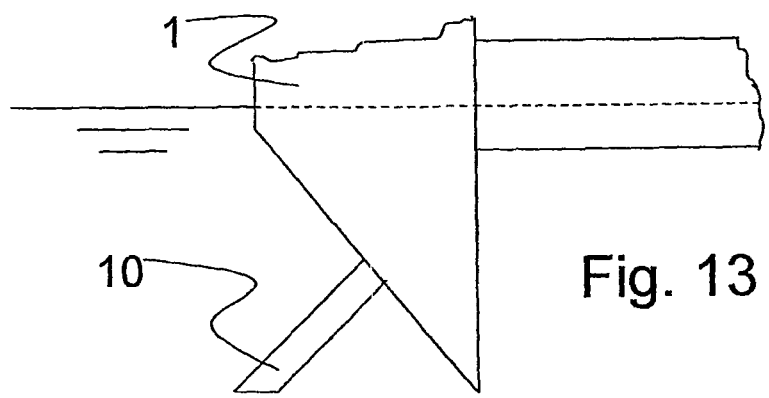
FIG. 13 shows schematically an anti-rolling device attached to one of the shells.

In FIG. 13 an anti-rolling device 10 is attached to one of the shells 1. The anti-rolling device 10 has several advantages, i.e. it reduces rolling movements of the floatable unit during the evacuation situation, it minimizes the risk for capsizing and it may be used as a rack for supporting the shells in the storage situation onboard of the ship.

Figure 14:
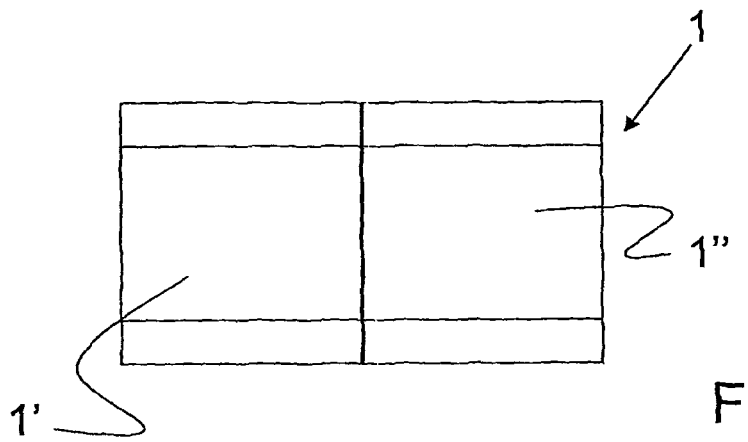
FIG. 14 shows schematically in a side view one shell, which comprises two shell parts in a storage situation.
Figure 15:
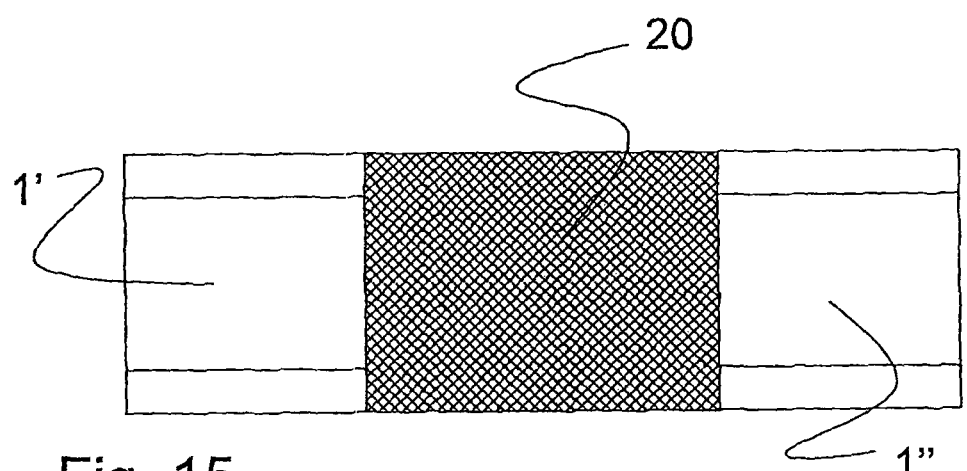
FIG. 15 shows schematically in a side view one embodiment of the shell of FIG. 14 in an evacuation situation.

In FIG. 14 one shell 1, which comprises two shell parts 1', 1" is shown in a storage situation. Within the inventive idea, the shell parts 1', 1" during an inflating procedure are being movable in a substantially longitudinal direction in relation to each other, and being connected by at least one element (not shown). In FIG. 15 the element 20 is shown as a fabric or textile, which connects the two shell parts 1', 1". In this case the two shell parts 1', 1" and the element 20 form one side of the floatable unit. By incorporating the element 20 between the shell parts 1', 1" it is obtained that the floatable unit in the evacuation situation is more flexible in the longitudinal direction of the unit. Thus, by connecting the shell parts 1', 1" by the element 20 the floatable unit may absorb more loads exerted to the floatable unit by the extreme environments, i.e. waves, wind, etc., as well as related to the sagging and/or hogging moments of the floatable unit so that the floatable unit is able to follow the waved surface of the water. Additionally, it is possible to make the floatable unit lighter. Furthermore, the shell parts 1', 1" will protect the floatable unit when it is being pressed and forced against the vessel side after being launched into the water. Advantageously, the element 20 is made of a flexible material. The element 20 may as well be made of rigid, partly flexible, resilient material or a combination thereof For additional securing the shell parts 1', 1" to each other supplementary securing devices may be implemented, such as wires, ropes or the like. Hereby is obtained that the securing devices relieve the fabric or textile connecting the shell parts 1', 1" so that they may absorb some of the high tensile forces which will occur during the movement of the floatable unit in the water.

Figure 16:
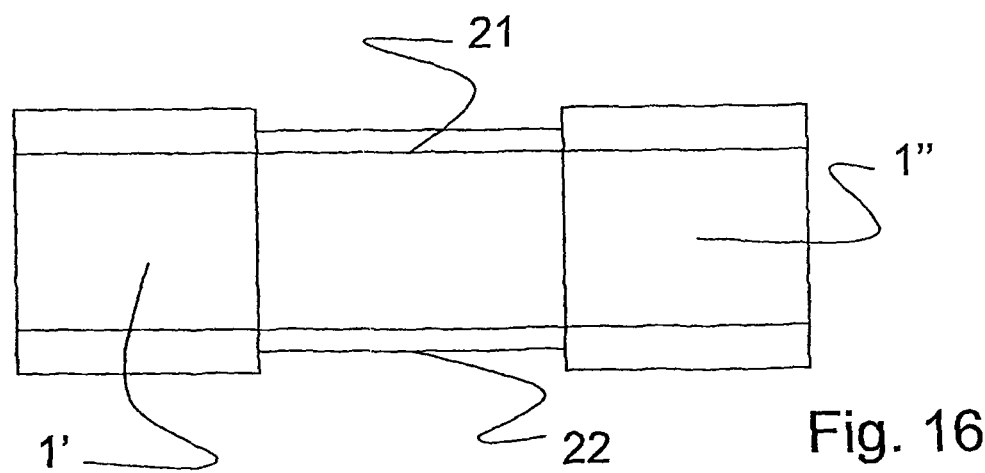
FIG. 16 shows schematically in a side view another embodiment of the shell of FIG. 14 in an evacuation situation.

In FIG. 16 another embodiment is shown. In this embodiment the shell parts 1', 1" are connected by two elements 21, 22. The elements 21, 22 are in this embodiment rods, bars or rails. The elements 21, 22 are connected to the shell parts 1', 1" at the top and the bottom. It is thereby obtained that the elements 21, 22 may act as either compression rods and/or tension rods depending on the longitudinal movement of the floatable unit, due to its sagging and/or hogging moments. The elements 21, 22 may be connected to the shell parts 1', 1" by a glide or rail system, so that when the shell is in the storage situation they are placed on the inner sides of the shell parts 1', 1" (not shown). In the evacuation situation when the inflatable structure is being inflated the shell parts 1', 1" will be extended in a longitudinal direction in relation to each other whereby the elements 21, 22 also will be displaced and end up in the position shown in FIG. 16.

Figure 17:
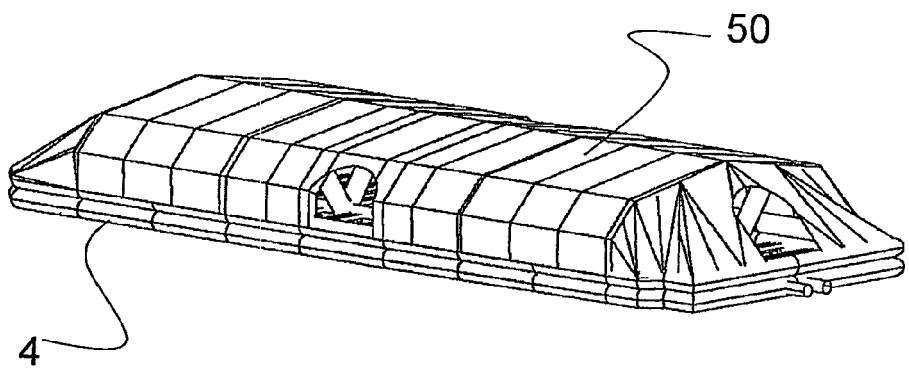
FIG. 17 shows in a perspective view one embodiment of the inflated structure with a canopy.

In FIG. 17 one embodiment of the inflated structure 4 according to the invention is shown. The inflated structure 4 is in this embodiment shown with a canopy 50 providing shelter for the evacuated person present in the floatable unit.

Figure 18:
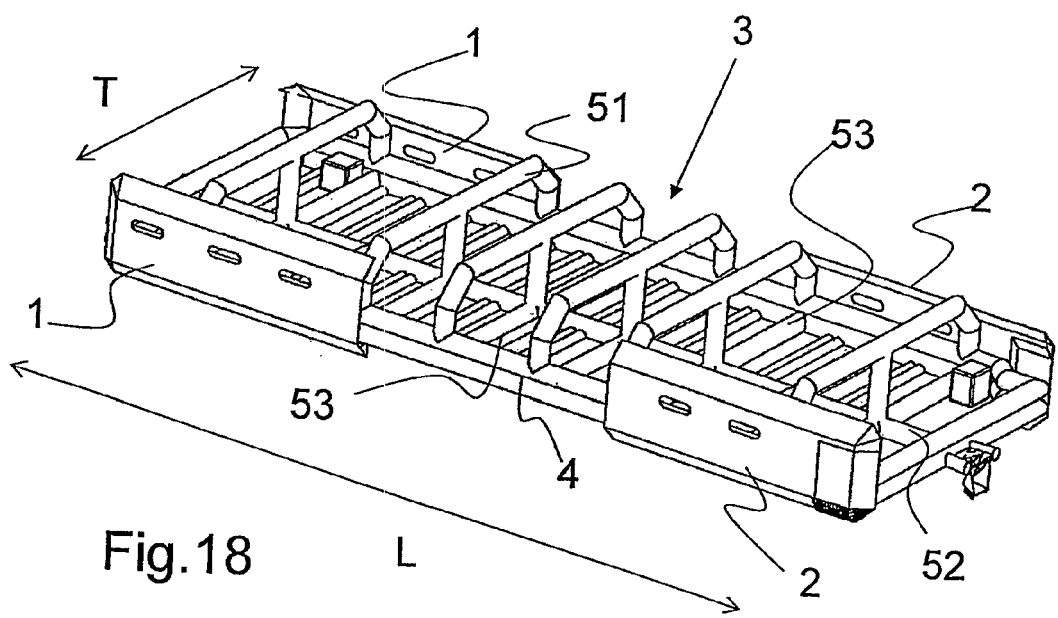
FIG. 18 shows in a perspective view an embodiment of the floatable unit according to the invention.

In FIG. 18 the inflated structure 4 of FIG. 17 is shown without the canopy and with four shells 1, 2 according to the invention. The floatable unit 3 has a longitudinal direction L and a transverse direction T; four corners being created between the longitudinal direction and the transverse direction, said floatable unit 3 comprises in this embodiment one shell 1, 2 at each corner of the unit 3, said shells 1, 2 extending from each corner in the longitudinal direction L of the unit 3 and said shells 1, 2 being mutually connected via the inflated structure 4. The matter is that the shells 1, 2 during the inflating of the inflated structure 4 are displaced in relation to each other both in the longitudinal direction L and the transverse direction T of the floatable unit 3. The inflated structure 4 also comprises inflatable canopy frames 51, said canopy frames being arranged in the transverse direction of the inflated structure 4 with a predetermined distance between them. Furthermore, a longitudinal girder 52 is arranged substantially in the centre line of the inflated structure 4 for increasing the strength of the floatable unit 3 in the longitudinal direction L. Transverse girders 53 are arranged in the transverse direction T for increasing the strength of the floatable unit 3 in the transverse direction T. The number of the transverse girders may be reduced by incorporating transverse seating arrangements, which will be further described below.

In the present embodiment the shells 1, 2 are indirectly connected to each other in the longitudinal direction of the floatable unit 3 via the inflated structure 4. In other not shown embodiments, the shells may extend in the entire direction of the floatable unit 3, whereby the entire side of the inflated structure 4 is covered by the shells. In other embodiments (not shown), the shells may be directly connected by elements as described above or even a ballast system, extending between the shells.

Figure 19:
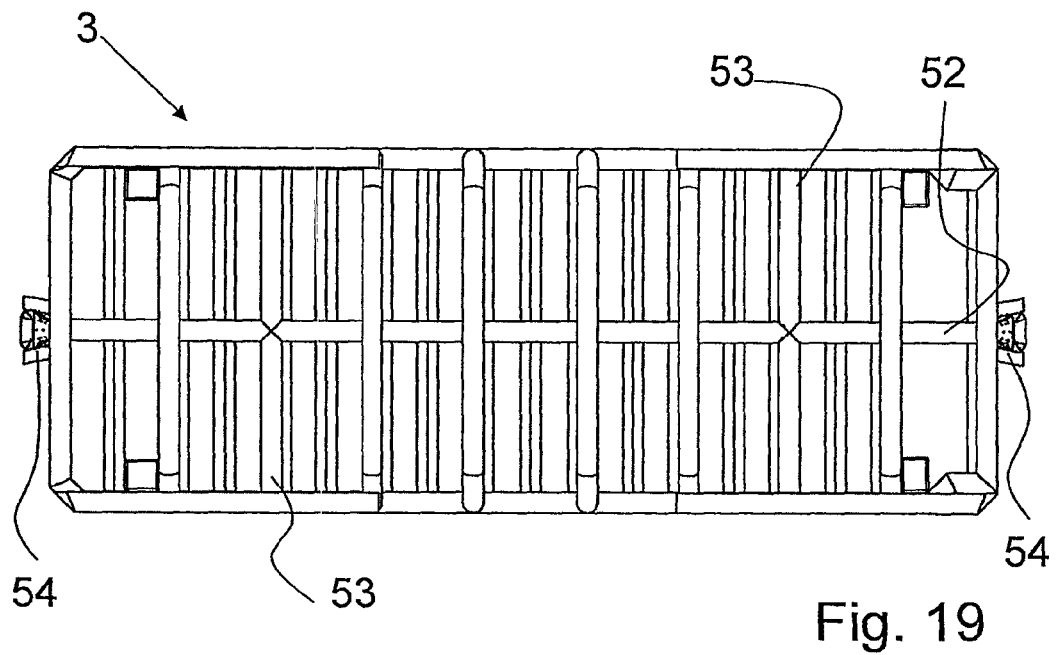
FIG. 19 shows the floatable unit of FIG. 18 in a top view.

In FIG. 19 the embodiment of the floatable unit 3 of FIG. 18 is shown in a top view. Also, the extensions of the transverse and longitudinal girders 52, 53 are shown. At each end of the floatable unit 3 means 54 for entering the unit 3 from the water are arranged.

Figure 20:
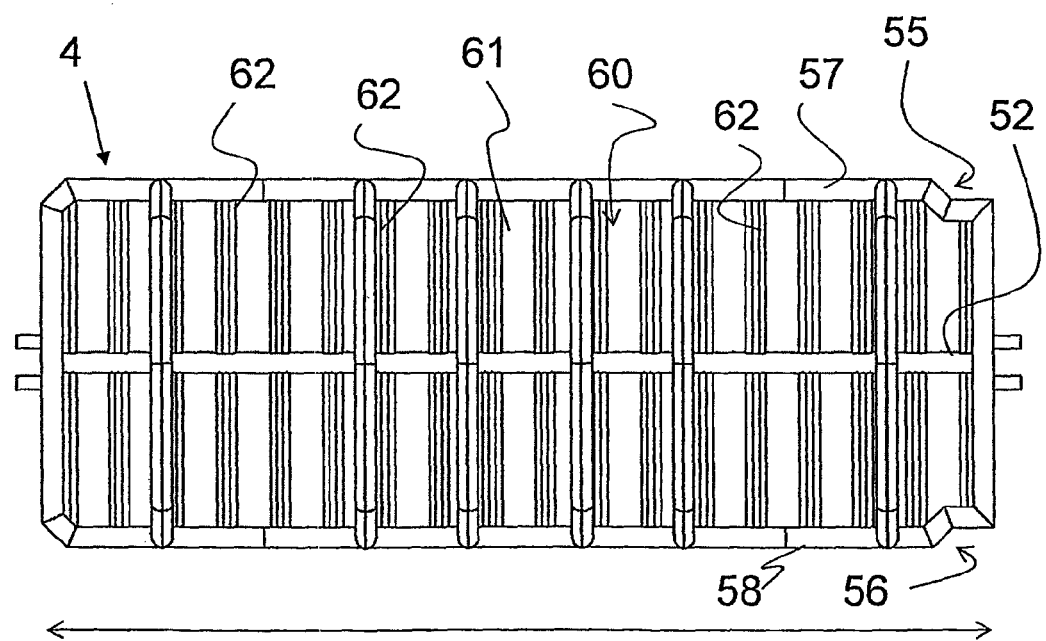
FIG. 20 shows in a top view an embodiment of the inflated structure.

In FIG. 20 one embodiment of the inflated structure 4 is shown in a top view. At one of the ends of the inflated structure 4 and in each side in this embodiment, the inflated structure 4 is arranged so that propulsion means can be arranged in a prolongation of the longitudinal direction L of the inflated structure 4. The matter is that the corners of the inflated structure 4 have indentations 55, 56, wherein the propulsion means may be arranged, for instance in connection with the corner shell, which will be described below in relation to FIG. 21. It is hereby obtained that the force from the propulsion means will be transferred to the inflatable tubes 57, 58 in their longitudinal directions which will be appreciated by person skilled in the art.

Furthermore, the inflated structure 4 comprise in this embodiment inflatable flotation tubes 57, 58. The inflatable tubes 57, 58 are extending circumferentially for providing a substantially ring-shaped area 60, and a bottom element 61 which is adapted to provide a bottom to the substantially ring-shaped area 60. In said ring-shaped area 60 a plurality of separate inflatable seating arrangements 62 are arranged. The seating arrangements 62 are arranged parallel to each other across the ring-shaped area 60, i.e. in the transverse direction of the inflated structure 4, with a predetermined distance between them. Hereby it is obtained that the persons being evacuated may be seated as they sit on a chair whereby the legs are bended. By incorporating the seating arrangements 62 it is obtained that more persons per area may be seated in relation to the known solutions, wherein the persons are seated directly on the bottom of the floatable units. Thus, the capacity of the floatable units may be increased whereby the number of units present on the ships may be decreased so that the ship owners may have additional room on the decks of their ships.

Furthermore, the seating arrangements provide the persons being evacuated a solution, which without any instructions motivates a correct placement on the seating arrangements 62 and thereby an optimum utilisation of the area of the unit. The seating arrangements 62 create a natural passage function in the area between the seating arrangements 62. By sitting in parallel arranged rows movement of the persons in the area between the seating arrangements 62 is facilitated. The seating arrangements 62 are arranged with a distance so that the persons sitting on opposite seating arrangements facing each other may lock their legs, whereby the persons will support each other. When persons also is sitting on the other side of the seating arrangement the persons will support each other both in the lateral direction as well as in the longitudinal direction, i.e. the persons are supported in all directions, whereby the influences from a stormy sea will be considerable less on the individual person. Furthermore, by sitting close on the seating arrangements 62 a thermal isolation between the persons sitting close is obtained, whereby an increased security against hypothermia is obtained. The seating arrangements 62 may be securely connected to the bottom of the unit, the outer tubes as well as the longitudinal girder 52, if present, and thereby take part of the transverse strengthen of the unit. The seating arrangements 62 may as well be detachable connected in parts of the unit so that they may be removed for creating space on the bottom.

Figure 21:
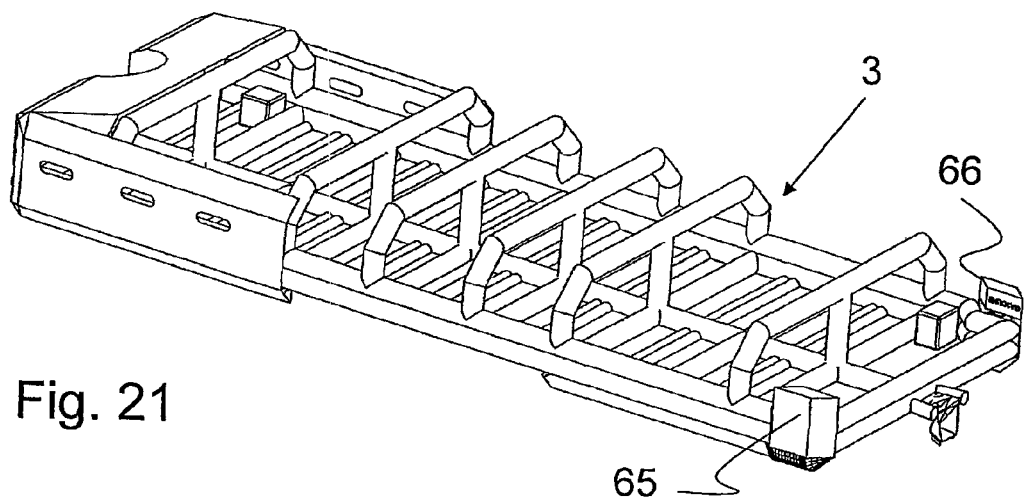
FIG. 21 shows in a perspective view the floatable unit of FIG. 18, wherein the shells in one end of the floatable unit not is present so that propulsion means are visible.

In FIG. 21 the floatable unit 3 of FIG. 18 is shown, wherein the shells in one end of the floatable unit 3 not are present so that propulsion means 65, 66 are visible.

Figure 22:
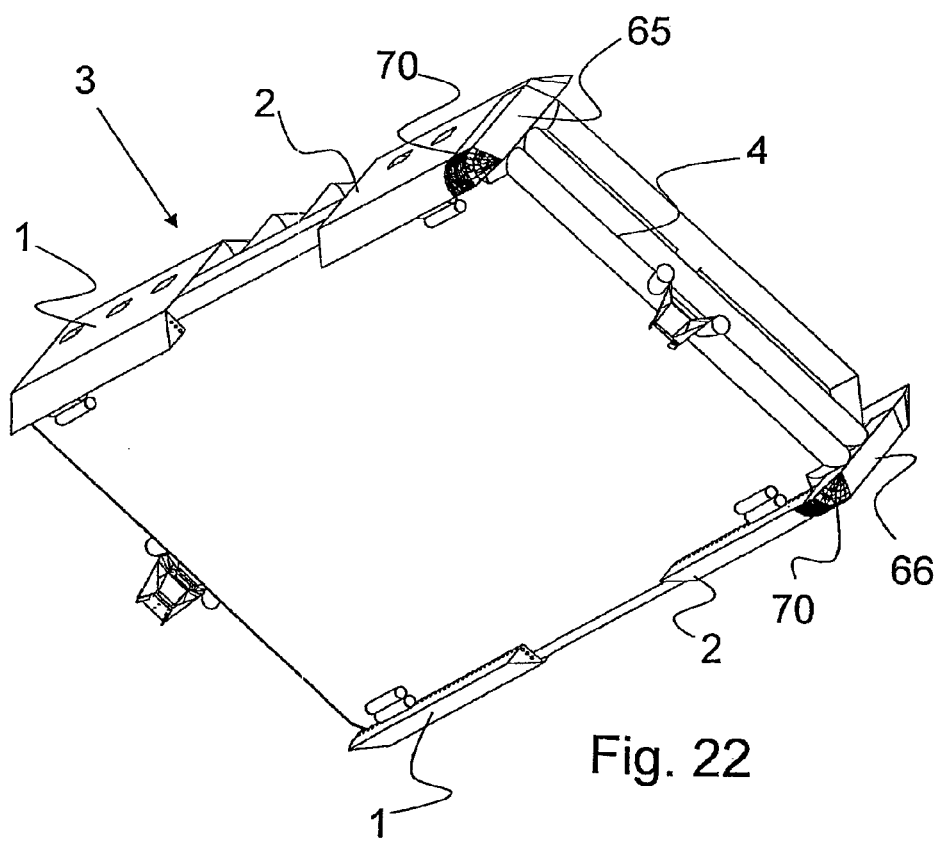
FIG. 22 shows the floatable unit of FIG. 18 seen from below in a perspective view.

In FIG. 22 the floatable unit 3 of FIG. 18 is shown seen from below. The shells 1, 2 are extending beyond the bottom of the inflated structure 4 so that a keel effect is obtained. Furthermore, the area of the shells 1, 2, which extends beyond the bottom, may comprise ballast means, which will further be described in connection with FIG. 23 below. The propulsion means 65, 66 are arranged as part of the shells 2. Preferably the propulsion means 65, 66 are separated from the inflated structure 4, so that the inflated structure 4 not may be damaged by the propulsion means. In this embodiment, the propulsion means comprise propellers (not shown), wherefore protection grates 70 are arranged around the propellers.

Figure 23:
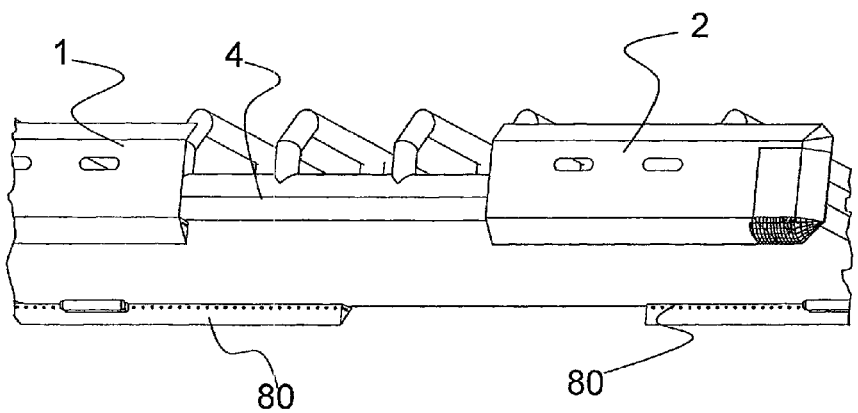
FIG. 23 shows an enlarged view of a part of the bottom of the floatable unit.

In FIG. 23 an enlarged view of a part of the bottom of the floatable unit 3 is shown. The area of the shells 1, 2 extending beyond the bottom of the inflated structure 4 comprises a plurality of openings 80. When the floatable unit 3 is deployed into the water, water may flow through said openings 80 into the bottom of the shells 1, 2 and thereby be used as ballast means, which stabilizes the unit. The bottom of the shells 1, 2 may be divided into a plurality of ballast chambers for minimizing the effects of the free surface areas.

Although the invention above has been described in connection with preferred embodiments of the invention, it will be evident for a person skilled in the art that several modifications are conceivable without departing from the invention as defined by the following claims.

The invention claimed is:

1. A floatable unit for evacuation purposes, said unit having a deflated storage configuration and an inflated deployed configuration, said unit comprising:
   at least a pair of rigid or semi-rigid shells, and
   an inflatable structure connected to said shells,
   said shells configured to contain said inflatable structure when said unit is in the deflated storage configuration,
   said shells forming at least one of hull structure and side structure for said unit, and said inflatable structure forming a 3-dimensional space frame interconnecting said shells and maintaining said shells in spaced relation, when said unit is in the inflated deployed configuration,
   said 3-dimensional space frame including at least one lower frame member, at least one upper frame member, and at least one connecting frame member connecting said lower and upper frame members.

2. The floatable unit of claim 1 wherein said shells and said inflatable structure are configured such that said shells pivot from a closed position to an open position during inflation of said inflatable structure.

3. The floatable unit of claim 2 wherein said hull structure is generally a V hull.

4. The floatable unit of claim 2 wherein said hull structure is generally a catamaran hull.

5. The floatable unit of claim 1 wherein at least one of said shells and said inflatable structure includes propulsion means.

6. The floatable unit of claim 5 wherein said inflatable structure includes a pair of corners each of which is configured to accommodate propulsion means.

7. A floatable unit for evacuation purposes, said unit having a deflated storage configuration and an inflated deployed configuration, said unit comprising:
   at least a pair of rigid or semi-rigid shells, and
   an inflatable structure connected to said shells,
   said shells configured to contain said inflatable structure when said unit is in the deflated storage configuration,
   said shells forming at least one of hull structure and side structure for said unit, and said inflatable structure forming a 3-dimensional space frame interconnecting said shells and maintaining said shells in spaced relation, when said unit is in the inflated deployed configuration,
   wherein said shells and said inflatable structure are configured such that said shells translate away from one another in a direction generally transverse to a longitudinal center line of said unit during inflation of said inflatable structure.

8. The floatable unit of claim 7 wherein said hull structure is generally a catamaran hull.

9. A floatable unit for evacuation purposes, said unit having a deflated storage configuration and an inflated deployed configuration, said unit comprising:
   at least a pair of rigid or semi-rigid shells, and
   an inflatable structure connected to said shells,
   said shells configured to contain said inflatable structure when said unit is in the deflated storage configuration,
   said shells forming at least one of hull structure and side structure for said unit, and said inflatable structure forming a 3-dimensional space frame interconnecting said shells and maintaining said shells in spaced relation, when said unit is in the inflated deployed configuration,
   wherein said shells and said inflatable structure are configured such that said shells translate away from one another in a direction generally parallel to a longitudinal center line of said unit during inflation of said inflatable structure.

10. The floatable unit of claim 9 wherein said shells are connected with a relatively flexible connecting element that extends when said shells translate away from one another and that collapses when said shells translate toward one another.

11. The floatable unit of claim 9 wherein said shells are connected with a relatively rigid connecting element on which said shells move when said shells translate away from one another and toward one another.

12. A floatable unit for evacuation purposes, said unit having a deflated storage configuration and an inflated deployed configuration, said unit comprising:
   at least a pair of rigid or semi-rigid shells, and
   an inflatable structure connected to said shells,
   said shells configured to contain said inflatable structure when said unit is in the deflated storage configuration,
   said shells forming at least one of hull structure and side structure for said unit, and said inflatable structure forming a 3-dimensional space frame interconnecting said shells and maintaining said shells in spaced relation, when said unit is in the inflated deployed configuration,
   including first and second pairs of said shells, and wherein said shells and said inflatable structure are configured such that said shells of said first pair translate away from one another in a direction generally transverse to a longitudinal center line of said unit during inflation of said inflatable structure, said shells of said second pair translate away from one another in a direction generally transverse to a longitudinal center line of said unit during inflation of said inflatable structure, and said first pair of shells and said second pair of shells translate away from one another in a direction generally parallel to a longitudinal center line of said unit during inflation of said inflatable structure.

13. The floatable unit of claim 12 wherein said hull structure is generally a catamaran hull.

14. The floatable unit of claim 12 wherein each of said first pair of shells are connected to a respective one of said second pair of shells with a relatively flexible connecting element that extends when said first and second pairs of shells translate away from one another and that collapses when said first and second pairs of shells translate toward one another.

15. The floatable unit of claim 12 wherein each of said first pair of shells are connected to a respective one of said second pair of shells with a relatively rigid connecting element on which said first and second pairs of shells move when said first and second pairs of shells translate away from one another and toward one another.

16. A floatable unit for evacuation purposes, said unit having a deflated storage configuration and an inflated deployed configuration, said unit comprising:
   at least a pair of rigid or semi-rigid shells, and
   an inflatable structure connected to said shells,
   said shells configured to contain said inflatable structure when said unit is in the deflated storage configuration,
   said shells forming at least one of hull structure and side structure for said unit, and said inflatable structure forming a 3-dimensional space frame interconnecting said shells and maintaining said shells in spaced relation, when said unit is in the inflated deployed configuration,
   wherein said 3-dimensional space frame includes a plurality of frame members extending generally transversely from one side of a longitudinal center line of said unit over the longitudinal center line of said unit to the other side of the longitudinal center line of said unit.

17. A floatable unit for evacuation purposes, said unit having a deflated storage configuration and an inflated deployed configuration, said unit comprising:

at least a pair of rigid or semi-rigid shells, and
an inflatable structure connected to said shells,
said shells configured to contain said inflatable structure when said unit is in the deflated storage configuration,
said shells forming at least one of hull structure and side structure for said unit, and said inflatable structure forming a 3-dimensional space frame interconnecting said shells and maintaining said shells in spaced relation, when said unit is in the inflated deployed configuration,
said 3-dimensional space frame including at least one lower frame member, at least one upper frame member, and at least one connecting frame member connecting said lower and upper frame members,
wherein said lower frame member is a circumferentially extending float tube.

18. The floatable unit of claim 17 wherein said 3-dimensional space frame includes a bottom element within a circumference of said float tube.

19. A floatable unit for evacuation purposes, said unit having a deflated storage configuration and an inflated deployed configuration, said unit comprising:
at least a pair of rigid or semi-rigid shells, and
an inflatable structure connected to said shells,
said shells configured to contain said inflatable structure when said unit is in the deflated storage configuration,
said shells forming at least one of hull structure and side structure for said unit, and said inflatable structure forming a 3-dimensional space frame interconnecting said shells and maintaining said shells in spaced relation, when said unit is in the inflated deployed configuration,
wherein said 3-dimensional space frame includes a longitudinal girder extending generally along a longitudinal center line of said unit and a plurality of transverse girders extending generally transversely to the longitudinal center line of said unit.

20. A floatable unit for evacuation purposes, said unit having a deflated storage configuration and an inflated deployed configuration, said unit comprising:
at least a pair of rigid or semi-rigid shells, and
an inflatable structure connected to said shells,
said shells configured to contain said inflatable structure when said unit is in the deflated storage configuration,
said shells forming at least one of hull structure and side structure for said unit, and said inflatable structure forming a 3-dimensional space frame interconnecting said shells and maintaining said shells in spaced relation, when said unit is in the inflated deployed configuration,
wherein said 3-dimensional space frame includes a circumferentially extending float tube,
wherein said 3-dimensional space frame includes a bottom element within a circumference of said float tube,
wherein said 3-dimensional space frame includes a plurality of rows of seats extending generally transversely to a longitudinal center line of said unit.

* * * * *